United States Patent
Stecklein et al.

(10) Patent No.: US 12,347,024 B2
(45) Date of Patent: Jul. 1, 2025

(54) UNCONSTRAINED MULTIPLANE IMAGES

(71) Applicant: Apple Inc., Cupertino, CA (US)

(72) Inventors: Michael Stecklein, Round Rock, TX (US); Afshin Taghavi Nasrabadi, Santa Clara, CA (US); Maneli Noorkami, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 246 days.

(21) Appl. No.: 18/104,773

(22) Filed: Feb. 1, 2023

(65) Prior Publication Data

US 2024/0096002 A1 Mar. 21, 2024

Related U.S. Application Data

(60) Provisional application No. 63/328,009, filed on Apr. 6, 2022.

(51) Int. Cl.
*G06T 15/20* (2011.01)
*G06T 15/04* (2011.01)

(52) U.S. Cl.
CPC .............. *G06T 15/20* (2013.01); *G06T 15/04* (2013.01)

(58) Field of Classification Search
CPC ........ G06T 15/20; G06T 15/04; G06T 15/503
See application file for complete search history.

(56) References Cited

U.S. PATENT DOCUMENTS

2021/0368157 A1* 11/2021 Overbeck ............ H04N 13/161

OTHER PUBLICATIONS

Zhou et al. Stereo Magnification: Learning view synthesis using multiplane images, ACM Trans. Graph., vol. 37, No. 4, Article 65. Publication date Aug. 2018. (Year: 2018).*
Tucker, et al., "Single-View View Synthesis with Multiplane Images," 2020 IEEE Conference on Computer Vision and Patter Recognition (CVPR), Jun. 2020, pp. 548-557.
Volker, et al., "Learning Light Field Synthesis with Multi-Plane Images: Scene Encoding as a Recurrent Segmentation Task," 2020 IEEE International Conference on Image Processing (ICIP), Oct. 2020, pp. 633-637.
Zhou, et al., "Stereo magnification," ACM Transactions on Graphics, Jul. 2018, vol. 37, No. 4, pp. 1-12.
International Search Report and Written Opinion from PCT/US2023/016993, dated Jun. 16, 2023, 10 pages.

* cited by examiner

*Primary Examiner* — Said Broome
*Assistant Examiner* — Donna J. Ricks
(74) *Attorney, Agent, or Firm* — BAKERHOSTETLER

(57) ABSTRACT

A set of planes is determined based on the vertices of a three-dimensional scene. The set of planes is determined independent of any particular orientation with respect to a reference viewpoint of the three-dimensional scene. The vertices are associated with the set of planes and respective textures are associated with the set of planes based on the associated vertices.

20 Claims, 3 Drawing Sheets

UNCONSTRAINED MULTIPLANE IMAGES

CROSS REFERENCE TO RELATED APPLICATIONS

This application claims the benefit of priority to U.S. Provisional Patent Application No. 63/328,009, entitled, "Unconstrained Multiplane Images", filed on Apr. 6, 2022, the disclosure of which is hereby incorporated herein in its entirety.

TECHNICAL FIELD

The subject application relates generally to image processing, including the representation of three-dimensional scenes using multiplane images.

BACKGROUND

Three-dimensional scenes may be represented using multiplane images. Conventionally, multiplane images include layers of parallel planes arranged at predetermined depths from a reference viewpoint of the scene. Each plane has an associated texture representing respective objects in the scene. Objects that are closer to the reference viewpoint are captured in the textures of planes at shallower depths with respect to the reference viewpoint, while objects that are farther from the reference viewpoint are captured in the textures of deeper planes.

BRIEF DESCRIPTION OF THE DRAWINGS

Certain features of the subject technology are set forth in the appended claims. However, for purpose of explanation, aspects of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form to avoid obscuring the concepts of the subject technology.

Figure 1:
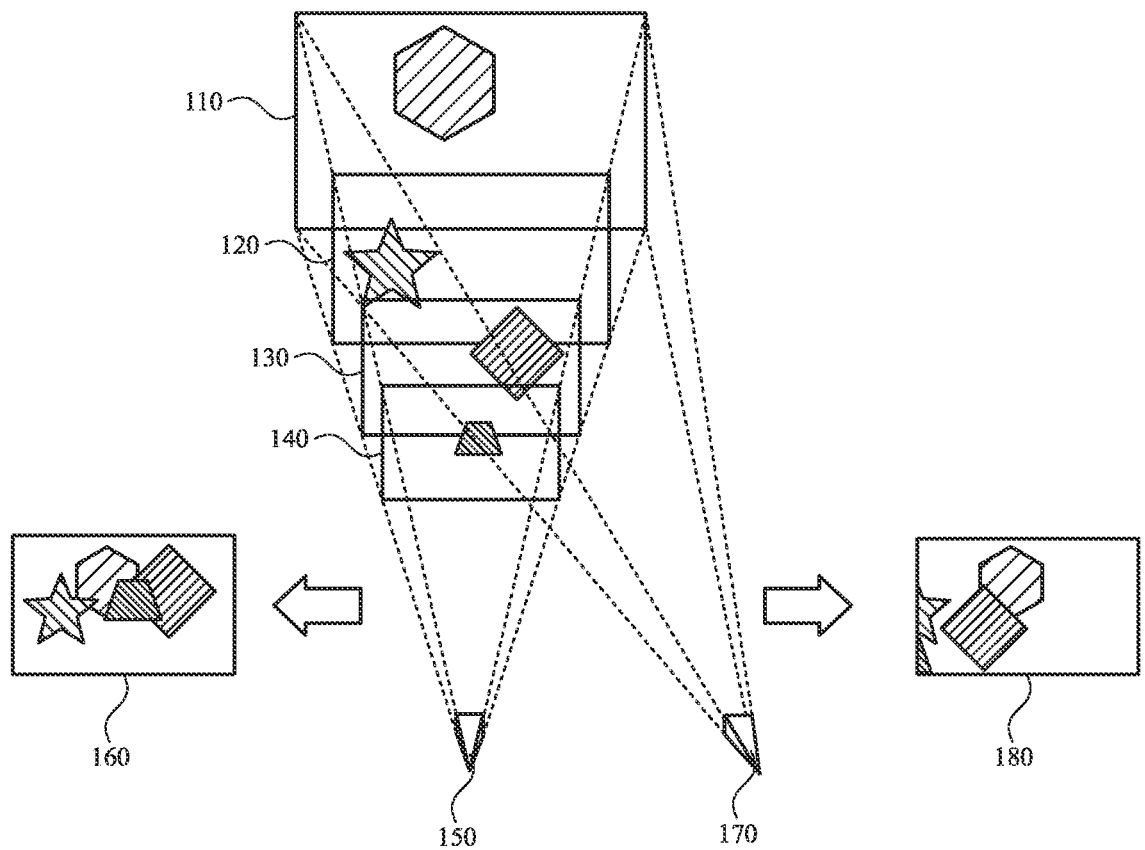
FIG. 1 illustrates an example multiplane image of a three-dimensional scene.

Three-dimensional scenes may be represented using multiplane images. Conventionally, multiplane images include layers of parallel planes arranged at predetermined depths from a reference viewpoint of the scene. For example, FIG. 1 illustrates a multiplane image comprising four parallel planes 110, 120, 130, and 140 arranged at predetermined depths from reference viewpoint 150. Each plane has an associated texture representing respective objects in the scene. The texture may be a red green blue (RGB) plus alpha texture, where the RGB channels represent the color content of the picture elements and the alpha channel represents the opacity of the picture elements. Objects that are closer to the reference viewpoint are captured in the textures of planes at shallower depths with respect to the reference viewpoint, while objects that are farther from the reference viewpoint are captured in the textures of deeper planes.

To render a view of the scene using the multiplane images, an alpha composite of the planes is generated starting with the plane farthest from the reference viewpoint and ending with the plane closest to the reference viewpoint. The alpha composite is generated by layering the planes and using the alpha values for each picture element in the respective planes to determine if the picture element is transparent or opaque. For example, rendered image 160 in FIG. 1 represents a view of the scene from the perspective of reference viewpoint 150. To render a view of the scene from a new viewpoint, such as new viewpoint 170 in FIG. 1, the planes are reoriented with respect to the new viewpoint and a new alpha composite is generated. The new viewpoint may be manually selected by a user manipulating a displayed image or may be determined based on a new orientation of a device being used to view the image, for example. Rendered image 180 in FIG. 1 represents a view of the scene from the perspective of new viewpoint 170.

Multiplane images can be used to approximate views of a scene within a limited range of the reference viewpoint. When a new viewpoint moves beyond the limited range artifacts, such as visible edges of the layers, may appear in the rendered image. The size of the limited range is dependent upon the content of the scene. Content of a scene that traverses from a deep depth to a shallow depth crossing multiple planes of the multiplane images limits the range. The closer this content is to being perpendicular to the planes, the narrower the textures on the respective planes becomes. Not only do the narrow textures result in artifacts when the new viewpoint shifts from the reference viewpoint, the narrow textures may present challenges when packing the layers' textures into a texture atlas containing all of the textures from the planes of the multiplane image. For example, narrow textures may not compress well and may be more susceptible to compression artifacts when rendering a compressed texture atlas.

Figure 2:
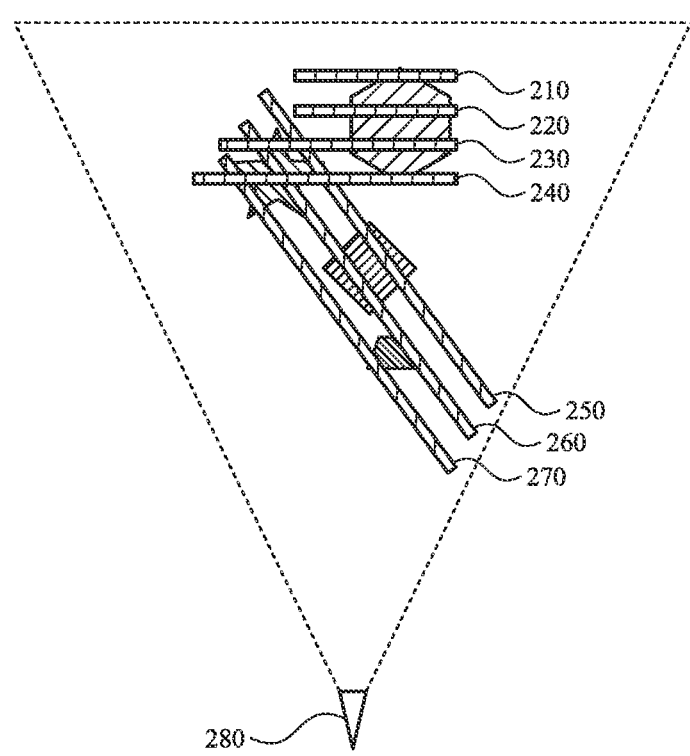
FIG. 2 illustrates an example multiplane image of a three-dimensional scene without constraints on the orientation of the planes according to aspects of the subject technology.

To address the foregoing challenges, the subject technology removes the constraints that the planes in a multiplane image must be parallel to each other and arranged at predetermined fixed distances from each other For example, FIG. 2 is a diagram illustrating the arrangement of planes in a multiplane image without constraints on the arrangement of the planes. In the example, illustrated in FIG. 2, planes 210, 220, 230, and 240 are arranged in a different orientation than planes 250, 260, and 270 with respect to viewpoint 280. The planes are selected to better align with the content of the scene. In this manner, larger textures may be captured in the planes which are easier to compress and are less susceptible to compression artifacts. Removing the parallel plane constraints allows the planes to better represent the content of a scene with a geometry that traverses a variety of directions.

The subject technology is not limited to the number or the orientations of the planes illustrated in FIG. 2 and may be implemented using different numbers and orientations of planes.

Figure 3:
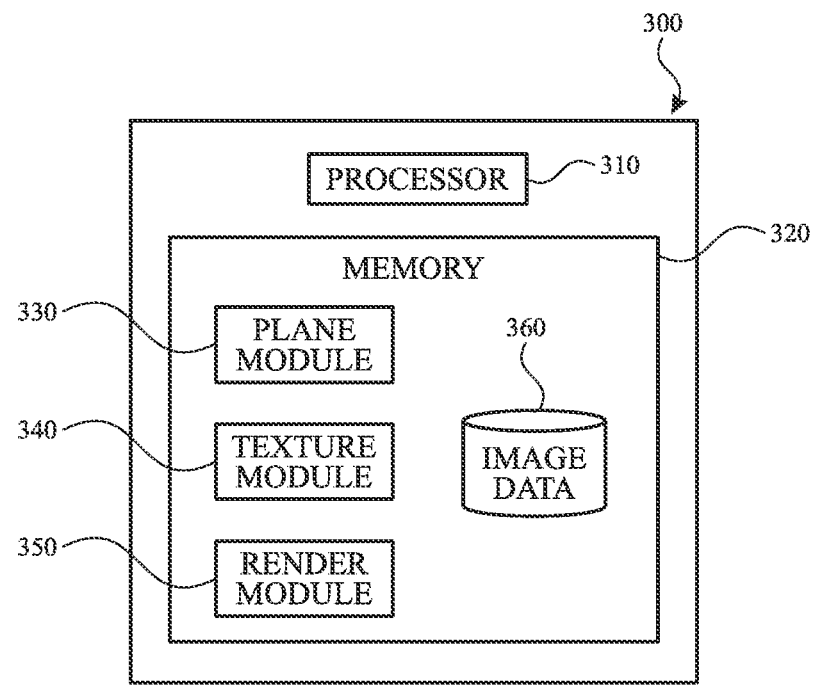
FIG. 3 is a block diagram illustrating a computing device according to aspects of the subject technology.

FIG. 3 is a block diagram illustrating components of a computing device in accordance with aspects of the subject technology. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

In the example depicted in FIG. 3, computing device 300 includes processor 310 and memory 320. Processor 310 may include suitable logic, circuitry, and/or code that enable processing data and/or controlling operations of computing device 300. In this regard, processor 310 may be enabled to provide control signals to various other components of computing device 300. Processor 310 may also control transfers of data between various portions of computing device 300. Additionally, the processor 310 may enable implementation of an operating system or otherwise execute code to manage operations of computing device 300.

Processor 310 or one or more portions thereof, may be implemented in software (e.g., instructions, subroutines, code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices), and/or a combination of both.

Memory 320 may include suitable logic, circuitry, and/or code that enable storage of various types of information such as received data, generated data, code, and/or configuration information. Memory 320 may include, for example, random access memory (RAM), read-only memory (ROM), flash memory, and/or magnetic storage. As depicted in FIG. 3, memory 320 contains plane module 330, texture module 340, render module 350, and image data 360. The subject technology is not limited to these components both in number and type, and may be implemented using more components or fewer components than are depicted in FIG. 3.

According to aspects of the subject technology, plane module 330 comprises a computer program having one or more sequences of instructions or code together with associated data and settings. Upon executing the instructions or code, one or more processes are initiated to determine a set of planes to represent a three-dimensional scene in a multiplane image. The set of planes may be determined based on the vertices of a mesh representing the three-dimensional scene with respect to a reference viewpoint of the three-dimensional scene.

According to aspects of the subject technology, a k-planes clustering algorithm may be used to determine a set of planes using the vertices of the mesh representing the three-dimensional scene. For example, each vertex may be assigned to its closest plane from an arbitrary set of planes. After all of the vertices have been assigned to planes, the algorithm finds a plane that minimizes the distance to each vertex in a cluster of assigned vertices corresponding to the respective planes. These steps may be repeated until the positions of the planes converge. When assigning vertices to planes, the algorithm may take into account the connectivity of vertices in the mesh of the three-dimensional scene in order to cluster vertices connected to each other in association with the same plane. The more connected vertices that are associated with a common plane, larger texture patches can be associated with the plane. The algorithm also may take into account the number of neighboring vertices from the mesh of the three-dimensional scene that are associated with a particular plane when deciding whether to assign a particular vertex to that plane.

The subject technology is not limited to using the k-planes clustering algorithm or the different variations of that algorithm mentioned above. Other techniques for identifying planes to represent a three-dimensional scene may be used. For example, plane detection algorithms used in computer vision applications also may be used to determine a set of planes.

According to aspects of the subject technology, texture module 340 comprises a computer program having one or more sequences of instructions or code together with associated data and settings. Upon executing the instructions or code, one or more processes are initiated to associate textures from the three-dimensional scene with the respective planes determined by plane module 330. For example, the coordinates of the vertices associated with the different respective planes may be determined. For each plane, the coordinates of the vertices associated with that plane may be used to define the boundaries of texture from the mesh representing the three-dimensional scene that is then associated with the plane.

According to aspects of the subject technology, render module 350 comprises a computer program having one or more sequences of instructions or code together with associated data and settings. Upon executing the instructions or code, one or more processes are initiated to render a view of a three-dimensional scene using a multiplane image generated from the scene. For example, render module 350 may orient the planes of the multiplane image so that the overlap of the planes when generating an alpha composite is from the perspective of a desired viewpoint. An alpha composite of the planes may then be generated starting with the plane farthest from the viewpoint to render the view.

According to aspects of the subject technology, image data 360 represents data used by plane module 330, texture module 340, and render module 350. For example, the data includes but is not limited to the mesh and texture of three-dimensional scenes, multiplane images generated from the three-dimensional scenes, atlases of the multiplane images, etc.

Figure 4:
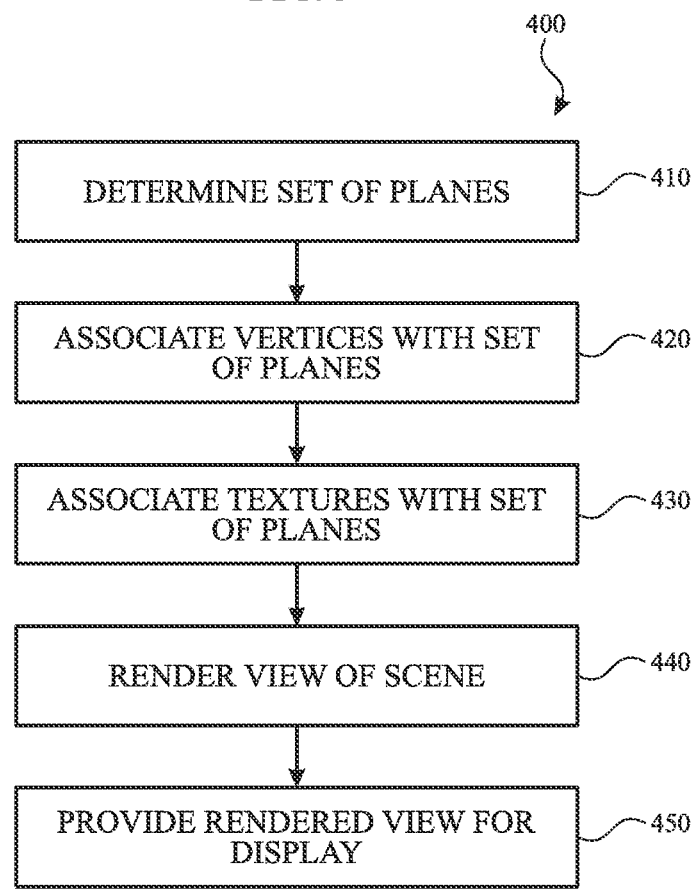
FIG. 4 illustrates a process flow for generating a multiplane image for a three-dimensional scene according to aspects of the subject technology.

FIG. 4 illustrates an example process for generating a multiplane image from a three-dimensional scene and rendering a view of the scene according to aspects of the subject technology. For explanatory purposes, the blocks of process 400 are described herein as occurring in serial, or linearly. However, multiple blocks of process 400 may occur in parallel. In addition, the blocks of process 400 need not be performed in the order shown and/or one or more blocks of process 400 need not be performed and/or can be replaced by other operations.

Process 400 may be initiated upon selection of a three-dimensional scene for which a multiplane image is desired. The scene may be selected by user input or may be automatically selected upon creation or storage of the scene. For the selected three-dimensional scene, a set of planes is determined independent of any particular orientation with respect to a reference viewpoint of the three-dimensional scene based on the vertices in a mesh of the three-dimensional scene (block 410). The reference viewpoint of the three-dimensional scene may be the point of view at which the three-dimensional scene was initially captured. With the determined set of planes, the vertices are associated with respective planes (block 420). Textures may then be associated with the respective planes based on the associated vertices (block 430). With a selected viewpoint, a view of the three-dimensional scene is rendered using a back-to-front alpha composite of the set of planes (block 440). The rendered view may then be provided for display to a user on a display device (block 450).

Figure 5:
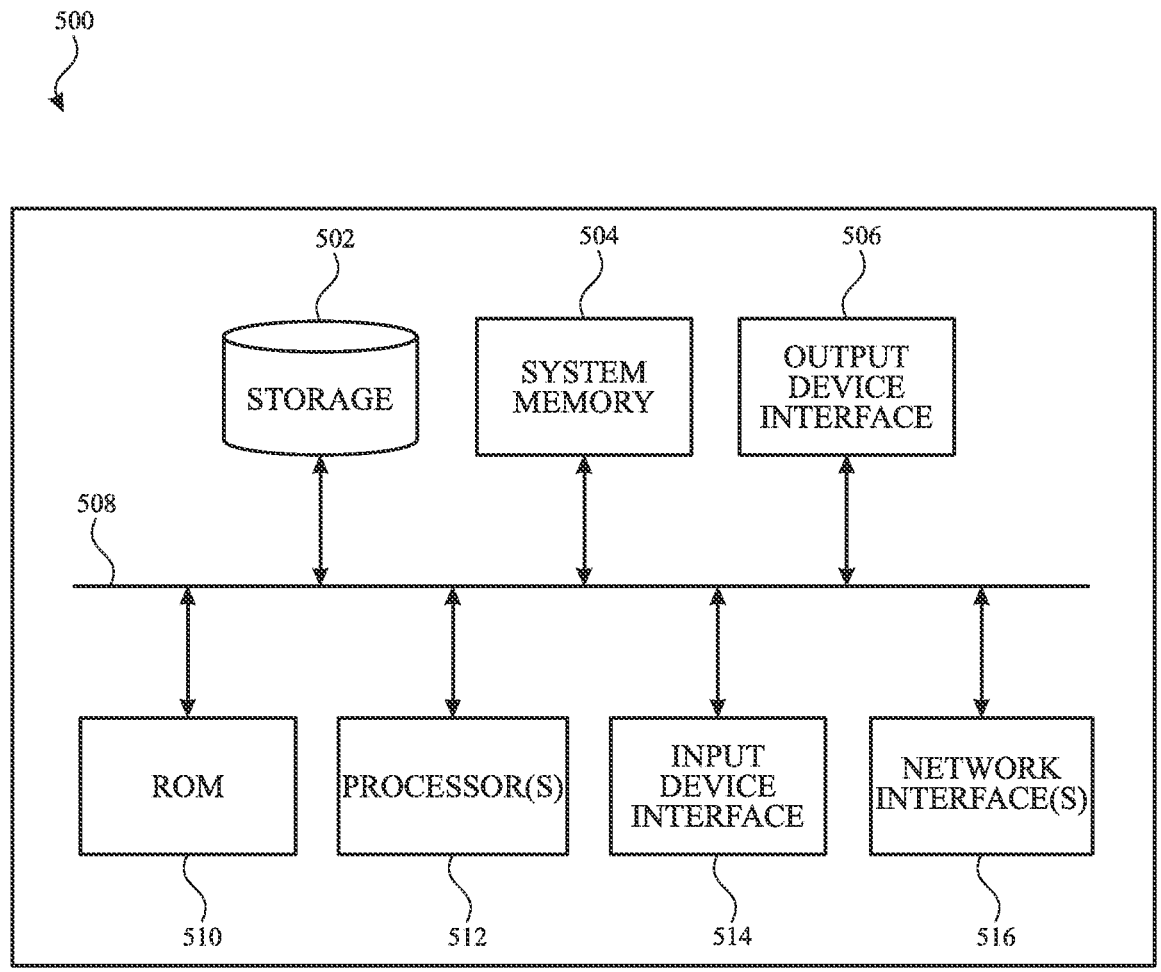
FIG. 5 illustrates an example electronic system with which aspects of the subject technology may be implemented.

FIG. 5 illustrates an electronic system 500 with which one or more implementations of the subject technology may be implemented. Electronic system 500 can be, and/or can be a part of, computing device 300 shown in FIG. 3. The electronic system 500 may include various types of computer readable media and interfaces for various other types of computer readable media. The electronic system 500 includes a bus 508, one or more processing unit(s) 512, a system memory 504 (and/or buffer), a ROM 510, a permanent storage device 502, an input device interface 514, an output device interface 506, and one or more network interfaces 516, or subsets and variations thereof.

The bus 508 collectively represents all system, peripheral, and chipset buses that communicatively connect the numerous internal devices of the electronic system 500. In one or more implementations, the bus 508 communicatively connects the one or more processing unit(s) 512 with the ROM 510, the system memory 504, and the permanent storage device 502. From these various memory units, the one or more processing unit(s) 512 retrieves instructions to execute and data to process in order to execute the processes of the subject disclosure. The one or more processing unit(s) 512 can be a single processor or a multi-core processor in different implementations.

The ROM 510 stores static data and instructions that are needed by the one or more processing unit(s) 512 and other modules of the electronic system 500. The permanent storage device 502, on the other hand, may be a read-and-write memory device. The permanent storage device 502 may be a non-volatile memory unit that stores instructions and data even when the electronic system 500 is off. In one or more implementations, a mass-storage device (such as a magnetic or optical disk and its corresponding disk drive) may be used as the permanent storage device 502.

In one or more implementations, a removable storage device (such as a flash drive) may be used as the permanent storage device 502. Like the permanent storage device 502, the system memory 504 may be a read-and-write memory device. However, unlike the permanent storage device 502, the system memory 504 may be a volatile read-and-write memory, such as random access memory. The system memory 504 may store any of the instructions and data that one or more processing unit(s) 512 may need at runtime. In one or more implementations, the processes of the subject disclosure are stored in the system memory 504, the permanent storage device 502, and/or the ROM 510. From these various memory units, the one or more processing unit(s) 512 retrieves instructions to execute and data to process in order to execute the processes of one or more implementations.

The bus 508 also connects to the input and output device interfaces 514 and 506. The input device interface 514 enables a user to communicate information and select commands to the electronic system 500. Input devices that may be used with the input device interface 514 may include, for example, alphanumeric keyboards and pointing devices (also called "cursor control devices"). The output device interface 506 may enable, for example, the display of images generated by electronic system 500. Output devices that may be used with the output device interface 506 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 5, the bus 508 also couples the electronic system 500 to one or more networks and/or to one or more network nodes through the one or more network interface(s) 516. In this manner, the electronic system 500 can be a part of a network of computers (such as a LAN, a wide area network ("WAN"), or an Intranet, or a network of networks, such as the Internet. Any or all components of the electronic system 500 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

In accordance with the subject disclosure, a method is provided that includes determining, independent of any particular orientation with respect to a reference viewpoint of a three-dimensional scene, a set of planes based on a plurality of vertices of the three-dimensional scene, associating the plurality of vertices with the set of planes, and associating respective textures with the set of planes based on the associated plurality of vertices.

The method may further include rendering a view of the three-dimensional scene based on the set of planes and a new viewpoint, and providing the rendered view for display. At least two of the planes in the set of planes may not be parallel to each other.

Determining the set of planes may include assigning the plurality of vertices to planes of the set of planes, and updating the set of planes based on the vertices assigned to the respective planes. The steps of assigning the plurality of vertices to planes and updating the set of planes may be repeated. Assigning the plurality of vertices to planes of the set of planes may be based on connectivity between vertices of the plurality of vertices in the three-dimensional scene. Assigning the plurality of vertices to planes of the set of planes may be based on a count of neighboring vertices from the three-dimensional scene assigned to the respective planes of the set of planes.

In accordance with the subject disclosure, a non-transitory computer-readable medium is provided that is storing instructions which, when executed by one or more processors, cause the one or more processors to perform operations. The operations include determining, independent of any particular orientation with respect to a reference viewpoint of a three-dimensional scene, a set of planes based on a plurality of vertices of the three-dimensional scene, associating the plurality of vertices with the set of planes, and associating respective textures with the set of planes based on the associated plurality of vertices. The operations further include rendering a view of the three-dimensional scene based on the set of planes and a new viewpoint, and providing the rendered view for display.

At least two of the planes in the set of planes may not be parallel to each other. The operation of determining the set of planes may include assigning the plurality of vertices to planes of the set of planes, and updating the set of planes based on the vertices assigned to the respective planes. The operations may further comprise repeating the steps of assigning the plurality of vertices to planes and updating the set of planes. The operation of assigning the plurality of vertices to planes of the set of planes may be based on connectivity between vertices of the plurality of vertices in the three-dimensional scene. The operation of assigning the plurality of vertices to planes of the set of planes may be based on a count of neighboring vertices from the three-dimensional scene assigned to the respective planes of the set of planes.

In accordance with the subject disclosure, a device is provided that includes a memory storing a plurality of computer programs, and one or more processors configured to execute instructions of the plurality of computer programs. The one or more processors are configured to execute the instructions to determine, independent of any particular orientation with respect to a reference viewpoint of a three-dimensional scene, a set of planes based on a plurality of vertices of the three-dimensional scene, associate the plurality of vertices with the set of planes, and associate respective textures with the set of planes based on the associated plurality of vertices.

The one or more processors may be further configured to execute instructions to render a view of the three-dimensional scene based on the set of planes and a new viewpoint, and provide the rendered view for display. At least two of the planes in the set of planes may not be parallel to each other.

Determining the set of planes may include assigning the plurality of vertices to planes of the set of planes, and updating the set of planes based on the vertices assigned to the respective planes. The one or more processors may be further configured to execute instructions to repeat the steps of assigning the plurality of vertices to planes and updating the set of planes. Assigning the plurality of vertices to planes of the set of planes may be based on connectivity between vertices of the plurality of vertices in the three-dimensional scene. Assigning the plurality of vertices to planes of the set of planes may be based on a count of neighboring vertices from the three-dimensional scene assigned to the respective planes of the set of planes.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an storage device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method, comprising:
   determining, by a processor, independent of any particular orientation with respect to a reference viewpoint of a three-dimensional scene, a set of planes based on a plurality of vertices of the three-dimensional scene;
   associating, by the processor, the plurality of vertices with the set of planes; and
   associating, by the processor, respective textures with the set of planes based on the associated plurality of vertices.

2. The method of claim 1, further comprising:
   rendering a view of the three-dimensional scene based on the set of planes and a new viewpoint; and
   providing the rendered view for display.

3. The method of claim 1, wherein at least two of the planes in the set of planes are not parallel to each other.

4. The method of claim 1, wherein determining the set of planes comprises:
   assigning the plurality of vertices to planes of the set of planes; and
   updating the set of planes based on the vertices assigned to the respective planes.

5. The method of claim 4, further comprising repeating the steps of assigning the plurality of vertices to planes and updating the set of planes.

6. The method of claim 4, wherein assigning the plurality of vertices to planes of the set of planes is based on connectivity between vertices of the plurality of vertices in the three-dimensional scene.

7. The method of claim 4, wherein assigning the plurality of vertices to planes of the set of planes is based on a count of neighboring vertices from the three-dimensional scene assigned to the respective planes of the set of planes.

8. A non-transitory computer-readable medium storing instructions which, when executed by one or more processors, cause the one or more processors to perform operations comprising:
   determining, independent of any particular orientation with respect to a reference viewpoint of a three-dimensional scene, a set of planes based on a plurality of vertices of the three-dimensional scene;
   associating the plurality of vertices with the set of planes;
   associating respective textures with the set of planes based on the associated plurality of vertices;
   rendering a view of the three-dimensional scene based on the set of planes and a new viewpoint; and
   providing the rendered view for display.

9. The non-transitory computer-readable medium of claim 8, wherein at least two of the planes in the set of planes are not parallel to each other.

10. The non-transitory computer-readable medium of claim 8, wherein the operation of determining the set of planes comprises:
    assigning the plurality of vertices to planes of the set of planes; and
    updating the set of planes based on the vertices assigned to the respective planes.

11. The non-transitory computer-readable medium of claim 10, wherein the operations further comprise repeating the steps of assigning the plurality of vertices to planes and updating the set of planes.

12. The non-transitory computer-readable medium of claim 8, wherein the operation of assigning the plurality of vertices to planes of the set of planes is based on connectivity between vertices of the plurality of vertices in the three-dimensional scene.

13. The non-transitory computer-readable medium of claim 8, wherein the operation of assigning the plurality of vertices to planes of the set of planes is based on a count of neighboring vertices from the three-dimensional scene assigned to the respective planes of the set of planes.

14. A device, comprising:
a memory storing a plurality of computer programs; and
one or more processors configured to execute instructions of the plurality of computer programs to:
determine, independent of any particular orientation with respect to a reference viewpoint of a three-dimensional scene, a set of planes based on a plurality of vertices of the three-dimensional scene;
associate the plurality of vertices with the set of planes; and
associate respective textures with the set of planes based on the associated plurality of vertices.

15. The device of claim 14, wherein the one or more processors are further configured to execute instructions to:
render a view of the three-dimensional scene based on the set of planes and a new viewpoint; and
provide the rendered view for display.

16. The device of claim 14, wherein at least two of the planes in the set of planes are not parallel to each other.

17. The device of claim 14, wherein determining the set of planes comprises:
assigning the plurality of vertices to planes of the set of planes; and
updating the set of planes based on the vertices assigned to the respective planes.

18. The device of claim 17, wherein the one or more processors are further configured to execute instructions to repeat the steps of assigning the plurality of vertices to planes and updating the set of planes.

19. The device of claim 17, wherein assigning the plurality of vertices to planes of the set of planes is based on connectivity between vertices of the plurality of vertices in the three-dimensional scene.

20. The device of claim 17, wherein assigning the plurality of vertices to planes of the set of planes is based on a count of neighboring vertices from the three-dimensional scene assigned to the respective planes of the set of planes.

* * * * *